United States Patent
Shoemaker et al.

(10) Patent No.: US 10,505,197 B2
(45) Date of Patent: Dec. 10, 2019

(54) UNITIZED ELECTRODE ASSEMBLY WITH HIGH EQUIVALENT WEIGHT IONOMER

(75) Inventors: Krista Marie Shoemaker, Woodbury, CT (US); Robert Mason Darling, South Windsor, CT (US); Laura Roen Stolar, South Windsor, CT (US); Elise Lorraine Izzo, Windsor, CT (US)

(73) Assignee: AUDI AG, Ingolstadt (DE)

( * ) Notice: Subject to any disclaimer, the term of this patent is extended or adjusted under 35 U.S.C. 154(b) by 197 days.

(21) Appl. No.: 14/000,922

(22) PCT Filed: Mar. 11, 2011

(86) PCT No.: PCT/US2011/028060
§ 371 (c)(1),
(2), (4) Date: Aug. 22, 2013

(87) PCT Pub. No.: WO2012/125138
PCT Pub. Date: Sep. 20, 2012

(65) Prior Publication Data
US 2013/0330657 A1    Dec. 12, 2013

(51) Int. Cl.
*H01M 8/00* (2016.01)
*H01M 4/86* (2006.01)
*H01M 4/92* (2006.01)
*H01M 8/1004* (2016.01)

(52) U.S. Cl.
CPC ....... *H01M 4/8657* (2013.01); *H01M 4/8605* (2013.01); *H01M 4/8668* (2013.01); *H01M 4/92* (2013.01); *H01M 8/1004* (2013.01)

(58) Field of Classification Search
CPC .... H01M 4/8605; H01M 4/8657; H01M 4/92; H01M 4/8668; H01M 8/1004
USPC .......................................................... 429/524
See application file for complete search history.

(56) References Cited

U.S. PATENT DOCUMENTS

| | | |
|---|---|---|
| 3,282,875 A | 11/1966 | Connolly et al. |
| 4,414,338 A | 11/1983 | Kimoto et al. |
| 5,463,005 A | 10/1995 | Desmarteau |
| 5,608,022 A | 3/1997 | Nakayama et al. |
| 5,869,416 A | 2/1999 | Mussell |
| 5,882,810 A | 3/1999 | Mussell et al. |

(Continued)

FOREIGN PATENT DOCUMENTS

| | | |
|---|---|---|
| CN | 1201554 A | 12/1998 |
| CN | 1964115 A | 5/2007 |

(Continued)

OTHER PUBLICATIONS

Zhao et al. "Determination of the Electron Transfer Number for the Oxygen Reduction Reaction: From Theory to Experiment", ACS Catalysis 2016 6 (7), 4720-4728, DOI: 10.1021/acscatal.6b01581.*

(Continued)

*Primary Examiner* — Nicholas P D'Aniello
(74) *Attorney, Agent, or Firm* — Seed IP Law Group LLP

(57) ABSTRACT

A catalyst layer for use in a fuel cell includes catalytic nanoparticles and a perfluorosulfonic acid (PFSA) ionomer. The catalytic nanoparticles have a palladium or palladium alloy core and an atomically thin layer of platinum on an outer surface of the palladium or palladium alloy core. The PFSA ionomer has an equivalent weight equal to or greater than about 830. A unitized electrode assembly is also described.

12 Claims, 5 Drawing Sheets

(56) References Cited

U.S. PATENT DOCUMENTS

| | | |
|---|---|---|
| 6,106,963 A | 8/2000 | Nitta et al. |
| 6,232,264 B1 | 5/2001 | Lukehart et al. |
| 6,277,512 B1 | 8/2001 | Hamrock et al. |
| 6,294,612 B1 | 9/2001 | O'Brien |
| 6,733,914 B1 | 5/2004 | Grot et al. |
| 7,112,363 B2 | 9/2006 | Moya |
| 7,288,600 B2 | 10/2007 | Moya |
| 7,507,495 B2 | 3/2009 | Wang et al. |
| 7,615,307 B2 | 11/2009 | Wu et al. |
| 7,691,780 B2 | 4/2010 | Adzic et al. |
| 7,740,974 B2 | 6/2010 | Masel et al. |
| 7,785,728 B2 | 8/2010 | Masel et al. |
| 7,837,901 B2 | 11/2010 | Hsu et al. |
| 7,855,021 B2 | 12/2010 | Adzic et al. |
| 7,906,052 B2 | 3/2011 | Hadj Romdhane et al. |
| 8,216,680 B2 | 7/2012 | Hsu et al. |
| 2002/0160272 A1 | 10/2002 | Tanaka et al. |
| 2003/0059657 A1 | 3/2003 | Stone et al. |
| 2003/0096156 A1 | 5/2003 | Asaoka et al. |
| 2004/0241518 A1 | 12/2004 | Yang |
| 2005/0075240 A1 | 4/2005 | Yamamoto |
| 2005/0095487 A1 | 5/2005 | Hamrock et al. |
| 2005/0112434 A1 | 5/2005 | Park et al. |
| 2005/0113528 A1 | 5/2005 | Jing et al. |
| 2005/0186467 A1 | 8/2005 | Sugiura |
| 2006/0046134 A1 | 3/2006 | Cho et al. |
| 2006/0093885 A1 | 5/2006 | Krusic et al. |
| 2006/0135359 A1 | 6/2006 | Adzic et al. |
| 2006/0263659 A1 | 11/2006 | Cho et al. |
| 2007/0031722 A1 | 2/2007 | Adzic et al. |
| 2007/0069185 A1 | 3/2007 | Hsu et al. |
| 2007/0218342 A1 | 9/2007 | Han et al. |
| 2007/0244003 A1 | 10/2007 | Majima et al. |
| 2007/0281199 A1 | 12/2007 | Lousenberg |
| 2007/0282023 A1 | 12/2007 | Lousenberg |
| 2008/0102341 A1 | 5/2008 | Lee |
| 2008/0206616 A1 | 8/2008 | Atanassova et al. |
| 2008/0292931 A1 | 11/2008 | Schwartz et al. |
| 2009/0026944 A1 | 1/2009 | Riviere-Cazaux |
| 2009/0053576 A1 | 2/2009 | Wu |
| 2009/0053578 A1 | 2/2009 | Isomura et al. |
| 2009/0068541 A1 | 3/2009 | Yan et al. |
| 2009/0075139 A1 | 3/2009 | Kucernak et al. |
| 2009/0117257 A1 | 5/2009 | Monnier et al. |
| 2009/0117438 A1 | 5/2009 | Saito et al. |
| 2009/0220682 A1 | 9/2009 | Monnier et al. |
| 2009/0246592 A1 | 10/2009 | Kinoshita |
| 2009/0269644 A1 | 10/2009 | Hamrock et al. |
| 2010/0008840 A1 | 1/2010 | Zhong et al. |
| 2010/0086831 A1 | 4/2010 | Fisher et al. |
| 2010/0086832 A1 | 4/2010 | Lopez et al. |
| 2010/0092841 A1 | 4/2010 | Lopez et al. |
| 2010/0099012 A1 | 4/2010 | Adzic |
| 2010/0216632 A1 | 8/2010 | Adzic et al. |
| 2010/0304267 A1 | 12/2010 | Mikhail et al. |
| 2010/0316937 A1 | 12/2010 | Sakamoto et al. |
| 2011/0200915 A1 | 8/2011 | Goto et al. |
| 2011/0223444 A1 | 9/2011 | Brown et al. |
| 2012/0046164 A1 | 2/2012 | Tanaka et al. |
| 2012/0251926 A1 | 10/2012 | Shirvanian |
| 2013/0029842 A1 | 1/2013 | Kimura et al. |
| 2013/0059219 A1 | 3/2013 | Kimura et al. |
| 2013/0281555 A1 | 10/2013 | Yang et al. |
| 2013/0295486 A1 | 11/2013 | Shao |
| 2013/0319871 A1 | 12/2013 | Murata et al. |
| 2014/0038078 A1 | 2/2014 | Shao |
| 2014/0178575 A1 | 6/2014 | Iio et al. |
| 2015/0255798 A1 | 9/2015 | Shao |
| 2015/0333354 A1 | 11/2015 | Yang et al. |
| 2015/0337064 A1 | 11/2015 | Yang et al. |
| 2015/0340721 A1 | 11/2015 | Yang et al. |

FOREIGN PATENT DOCUMENTS

| | | |
|---|---|---|
| CN | 1973391 A | 5/2007 |
| CN | 101318131 A | 12/2008 |
| CN | 101875010 A | 11/2010 |
| CN | 102039124 A | 5/2011 |
| JP | 55-11047 | 1/1980 |
| JP | 7-145362 | 6/1995 |
| JP | H10284087 A | 10/1998 |
| JP | H10340732 A | 12/1998 |
| JP | 2000-188013 A | 7/2000 |
| JP | 2002-042825 A | 2/2002 |
| JP | 2002-212234 A | 7/2002 |
| JP | 2002-324559 A | 11/2002 |
| JP | 2003-511523 A | 3/2003 |
| JP | 2003-246906 A | 9/2003 |
| JP | 2005-248104 A | 9/2005 |
| JP | 2005-272970 A | 10/2005 |
| JP | 2005-353581 | 12/2005 |
| JP | 2006-281155 | 10/2006 |
| JP | 2007-157645 A | 6/2007 |
| JP | 2007-173196 | 7/2007 |
| JP | 2007-335265 | 12/2007 |
| JP | 2008-034216 | 2/2008 |
| JP | 2008-186798 A | 8/2008 |
| JP | 2008-210572 A | 9/2008 |
| JP | 2009-054339 A | 3/2009 |
| JP | 2009/538966 A | 11/2009 |
| JP | 2009-539225 A | 11/2009 |
| JP | 2010-089031 A | 4/2010 |
| JP | 2010-092799 A | 4/2010 |
| JP | 2010-129397 | 6/2010 |
| JP | 2010-214330 A | 9/2010 |
| JP | 2010-267582 | 11/2010 |
| JP | 2011-040363 | 2/2011 |
| JP | 2011-089143 A | 5/2011 |
| JP | 2011-134477 A | 7/2011 |
| JP | 2011-137216 A | 7/2011 |
| JP | 2011-218278 A | 11/2011 |
| JP | 2012-102345 A | 5/2012 |
| JP | 2012-226970 A | 11/2012 |
| JP | 5699287 B2 | 2/2015 |
| KR | 10-2009-0045412 A | 5/2009 |
| KR | 10-2011-0079668 A | 7/2011 |
| WO | 97/13287 A2 | 4/1997 |
| WO | 97/41168 A1 | 11/1997 |
| WO | 2005/045978 A2 | 5/2005 |
| WO | 2007/011900 A1 | 1/2007 |
| WO | 2007/142884 A2 | 12/2007 |
| WO | 2008/010824 A2 | 1/2008 |
| WO | WO2009/045879 A2 | 4/2009 |
| WO | WO2009/139747 A1 | 11/2009 |
| WO | WO2009/139748 A1 | 11/2009 |
| WO | WO2009/139749 A1 | 11/2009 |
| WO | WO2010/048407 A1 | 4/2010 |
| WO | 2010/107426 A1 | 9/2010 |
| WO | 2010/123896 A2 | 10/2010 |
| WO | WO2010/132050 A1 | 11/2010 |
| WO | 2011/112608 A1 | 9/2011 |
| WO | 2011/129967 A2 | 10/2011 |
| WO | 2011/148466 A1 | 12/2011 |
| WO | 2012/096653 A1 | 7/2012 |
| WO | 2012/105107 A1 | 8/2012 |
| WO | 2012/144974 A1 | 10/2012 |
| WO | 2012/174463 A1 | 12/2012 |

OTHER PUBLICATIONS

The PCT International Preliminary Report on Patentability dated Sep. 17, 2013 for International application No. PCT/US2011/028060.

Extended European Search Report, dated Sep. 10, 2014, for corresponding European Application No. 11861302.5-1360/2684239, 7 pages.

Neburchilov et al., "A review of polymer electrolyte membranes for direct methanol fuel cells," *Journal of Power Sources* 169:221-238, 2007.

(56) References Cited

OTHER PUBLICATIONS

Zhang et al., "Platinum Monolayer Electrocatalysts for $O_2$ Reduction: Pt Monolayer on Pd(111) and on Carbon-Supported Pd Nanoparticles," *J. Phys. Chem. B* 108:10955-10964, 2004.

International Preliminary Report on Patentability dated Jul. 25, 2013, for International Application No. PCT/US2011/020806, 7 pages.

International Search Report and Written Opinion dated Oct. 18, 2011, for International Application No. PCT/US2011/020806, 10 pages.

Alcaide et al., "Performance of carbon-supported PtPd as catalyst for hydrogen oxidation in the anodes of proton exchange membrane fuel cells," *International Journal of Hydrogen Energy* 35:11634-11641, 2010.

Creager et al., "New Bis[(perfluororalkyl)sulfonyl]imide Ionomers for PEM Fuel Cells," Polymeric Materials: Science and Engineering 80, 600 (1999).

Greeley et al., "Theoretical Trends in Particle Size Effects for the Oxygen Reduction Reaction," *Zeitschrift fur Physikalische Chemie* 221(9-10):1209-1220, 2007.

Hao et al., "Synthesis of monodisperse palladium nanocubes and their catalytic activity for methanol electrooxidation", Chin. Phys. B vol. 19, No. 10 (2010) 106104-1-106104-5.

Kondo et al., "Active Sites for the Oxygen Reduction Reaction on the Low and High Index Planes of Palladium," *The Journal of Physical Chemistry Letters C* 113(29):12625-12628, 2009.

Lim et al., "Facile Synthesis of Bimetallic Nanoplates Consisting of Pd Cores and Pt Shells through Seeded Epitaxial Growth," *Nano Letters* 8(8):2535-2540, 2008.

Lim et al., "Pd-Pt Bimetallic Nanodendrites with High Activity for Oxygen Reduction," *Science* 324:1302-1305, Jun. 2009.

Niu et al., "Seed-Mediated Growth of Nearly Monodisperse Palladium Nanocubes with Controllable Sizes," *Crystal Growth & Design* 8(12):4440-4444, 2008.

Stamenkovic et al., "Improved Oxygen Reduction Activity on $Pt_3Ni$(111) via Increased Surface Site Availability," *Science* 315:493-497, 2007.

Tao et al., "Shape Control of Colloidal Metal Nanocrystals," *small* 4(3):310-325, 2008.

Uematsu et al., "Synthesis of novel perfluorosulfonamide monomers and their application," Journal of Flourine Chemistry 127, 1087-1095 (2006).

Vidal-Iglesias et al., "Pd Adatom Decorated (100) Preferentially Oriented Pt Nanoparticles for Formic Acid Electrooxidation," *Angewandte Chemi International Edition* 122:7152-7155, 2010.

Xue, "Chemistry of Bis(perfluoroalkylsulfonyl)imides and Related Compounds," Dissertation presented to the Graduate School of Clemson University, Aug. 1996, 251 pages.

Zhang et al., "Platinum Monolayer on Nonnoble Metal-Noble Metal Core-Shell Nanoparticle Electrocatalysts for $O_2$ Reduction," *J. Phys. Chem. B* 109(48):22701-22704, 2005.

Zhou et al., "Palladium alloy catalyst research to formic acid catalytic performance," *The 8th National Academic Conference of Hydrogen Energy*, Oct. 12, 2007 (w/ partial English translation), 4 pages.

Zhou, "Synthesis and Characterization of Perfluorinated Sulfonimide Copolymers as Polymer Electrolyte Membranes," Dissertation presented to the Graduate School of Clemson University, Dec. 2002, 212 pages.

Jin et al., "Synthesis of Pd Nanocrystals Enclosed by {100} Facets and with Sizes <10 nm for Application in CO Oxidation", Nano. Res. 2011, 4(1): 83-91.

Telkar et al., "Shape-controlled preparation and catalytic activity of metal nanoparticles for hydrogenation of 2-butyne-1,4-diol and styrene oxide." Applied Catalysis A: General 273 (2004) 11-19.

Zhou et al., "Determination of the Electron Transfer Number For the Oxygen Reduction Reaction: From Theory to Experiment," ACS Catalysis 2016 6, 4720-4728.

Tian et al., "Platinum Metal Catalysts of High-Index Surfaces: From Single-Crystal Planes to Electrochemically Shape-Controlled Nanoparticles," *J. Phys. Chem. C* 112:19801-19817, 2008.

* cited by examiner

UNITIZED ELECTRODE ASSEMBLY WITH HIGH EQUIVALENT WEIGHT IONOMER

BACKGROUND

A unitized electrode assembly (UEA) for a fuel cell includes an anode, a cathode and an electrolyte between the anode and cathode. In one example, hydrogen gas is fed to the anode and air or pure oxygen is fed to the cathode. However, it is recognized that other types of fuels and oxidants can be used. At the anode, an anode catalyst causes the hydrogen molecules to split into protons (H$^+$) and electrons (e$^-$). The protons pass through the electrolyte to the cathode while the electrons travel through an external circuit to the cathode, resulting in production of electricity. At the cathode, a cathode catalyst causes the oxygen molecules to react with the protons and electrons from the anode to form water, which is removed from the system.

The anode catalyst and cathode catalyst commonly include supported platinum atoms. Platinum is a high-cost precious metal. Much work has been conducted to reduce the platinum loading in the cathode in order to reduce manufacturing costs. Additionally, work has been conducted to improve the kinetics of oxygen reduction in platinum oxygen-reducing cathode and reduce losses in potential in order to improve the efficiency of the fuel cell.

SUMMARY

A catalyst layer for use in a fuel cell includes catalytic nanoparticles and a perfluorosulfonic acid (PFSA) ionomer. The catalytic nanoparticles have a palladium or palladium alloy core and an atomically thin layer of platinum on an outer surface of the palladium or palladium alloy core. The PFSA ionomer has an equivalent weight equal to or greater than about 830. A unitized electrode assembly is also described.

BRIEF DESCRIPTION OF THE DRAWINGS

FIG. 2b is an enlarged cross-sectional view of one core-shell catalyst nanoparticle of FIG. 2a.

FIG. 3 illustrates a method of forming the catalyst layer of FIG. 2a.

DETAILED DESCRIPTION

A catalyst layer comprising a perfluorosulfonic acid (PFSA) ionomer with an equivalent weight equal to or greater than about 830 and core-shell catalyst nanoparticles for use in a fuel cell is described herein. Core-shell catalyst nanoparticle structures are being investigated for use in the catalyst layers of fuel cells due to their enhanced activity towards oxygen reduction and their reduction in platinum usage. The core of the core-shell catalyst nanoparticles is formed of palladium or a palladium alloy and the shell is formed of platinum or a platinum alloy. Core-shell catalysts experience palladium dissolution and exchange into the membrane. Palladium can dissolve readily at potentials over 0.8 volts (V) (all potentials described herein are on hydrogen scale), and defects in the platinum shell will expose the palladium core during use in the fuel cell. The properties of the ionomer are changed when palladium ions exchange with protons into the ionomer surrounding the catalytic particles. As described further below, the ionomer of the current unitized electrode assembly (UEA) exhibited little to no change in properties when contaminated with palladium.

Figure 1:
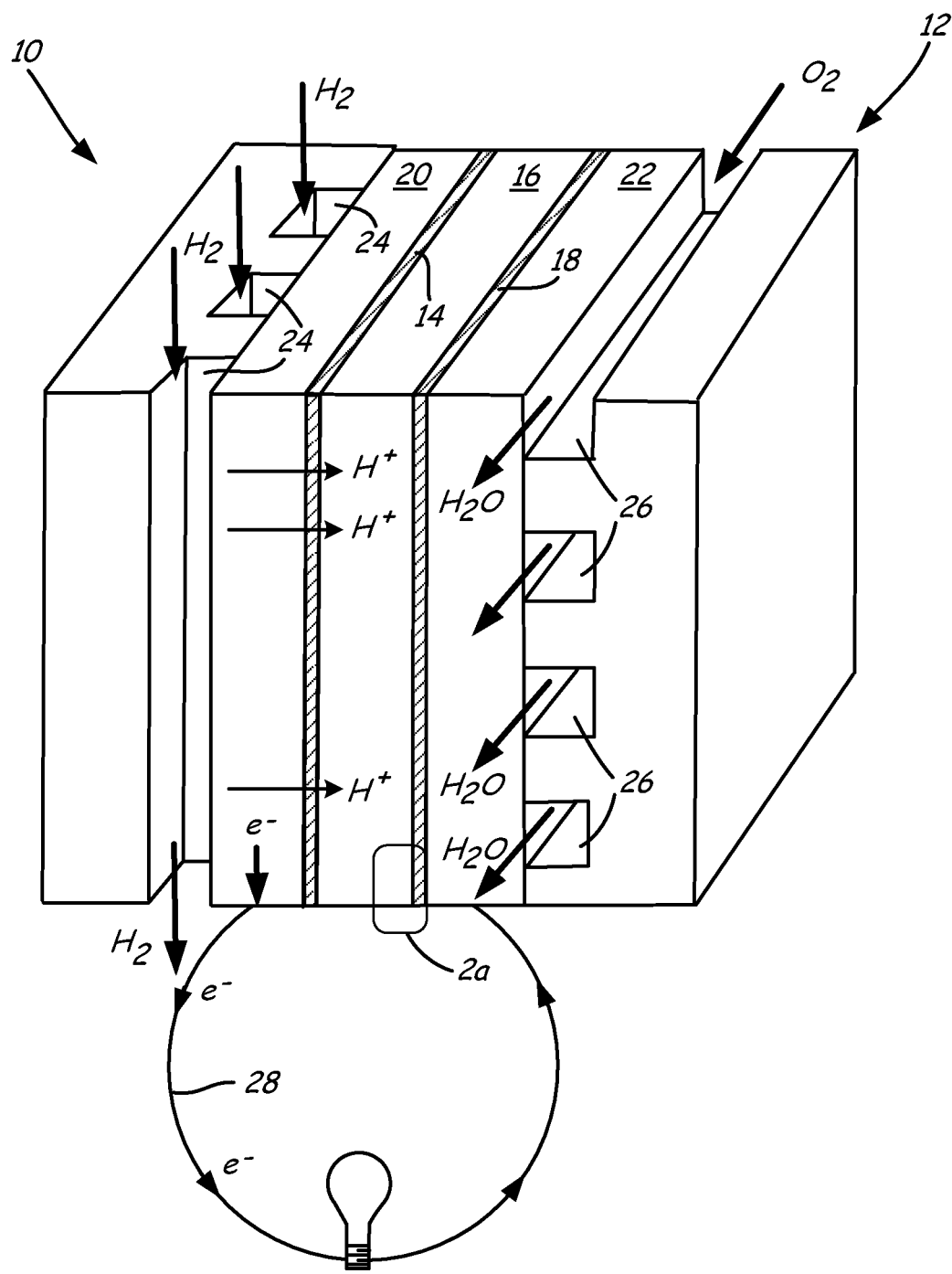
FIG. 1 is a perspective view of a fuel cell repeat unit having a catalyst layer.

Fuel cells convert chemical energy to electrical energy using one or more fuel cell repeat units. FIG. 1 illustrates a perspective view of one example fuel cell repeat unit 10, which includes unitized electrode assembly (UEA) 12 (having anode catalyst layer (CL) 14, electrolyte 16, cathode catalyst layer (CL) 18, anode gas diffusion layer (GDL) 20, and cathode gas diffusion layer (GDL) 22), anode flow field 24 and cathode flow field 26. Fuel cell repeat unit 10 can have coolant flow fields adjacent to anode flow field 24 and cathode flow field 26. Coolant flow fields are not illustrated in FIG. 1.

Anode GDL 20 faces anode flow field 24 and cathode GDL 22 faces cathode flow field 26. Anode CL 14 is positioned between anode GDL 20 and electrolyte 16, and cathode CL 18 is positioned between cathode GDL 22 and electrolyte 16. Fuel cell repeat unit 10 will be described as receiving hydrogen fuel (i.e., hydrogen gas) and oxygen oxidant (i.e., oxygen gas or air). However, other fuels and oxidants may be used.

In operation, anode GDL 20 receives hydrogen gas (H$_2$) by way of anode flow field 24. Anode CL 14, which contains a catalyst such as platinum, causes the hydrogen molecules to split into protons (H$^+$) and electrons (e$^-$). The protons and electrons travel to cathode CL 18; the protons pass through electrolyte 16 to cathode CL 18, while the electrons travel through external circuit 28, resulting in a production of electrical power. Air or pure oxygen (O$_2$) is supplied to cathode GDL 22 through cathode flow field 26. At cathode CL 18, oxygen molecules react with the protons and electrons from anode CL 14 to form water (H$_2$O), which then exits fuel cell 10, along with excess heat.

Electrolyte 16 is located between anode CL 14 and cathode CL 18. Electrolyte 16 allows movement of protons and water but does not conduct electrons. Protons and water from anode CL 14 can move through electrolyte 16 to cathode CL 18. In one example, electrolyte 16 is a perfluorosulfonic acid (PFSA)-containing polymer or ionomer, such as Nafion® by E.I. DuPont, USA. PFSA polymers are composed of fluorocarbon backbones with sulfonate groups attached to short fluorocarbon side chains. In another example, electrolyte 16 is a hydrocarbon based persulfonic acid.

Anode CL 14 is adjacent to the anode side of electrolyte 16. Anode CL 14 includes a catalyst that promotes electrochemical oxidation of fuel (i.e., hydrogen). Example catalysts for anode CL 14 include carbon supported platinum atoms and the core-shell catalyst nanoparticles described further below with respect to cathode CL 18.

Cathode CL 18 is adjacent to the cathode side of electrolyte 16 and opposite anode CL 14. Cathode CL 18 includes core-shell catalyst nanoparticles as described further below. The core-shell catalyst nanoparticles of cathode CL 18 promote electrochemical reduction of oxidant (i.e., oxygen). The core-shell catalyst nanoparticles have an enhanced activity towards oxygen reduction compared to previous carbon supported platinum catalysts. Further, the core-shell structure reduces platinum usage, and thus material costs because only a thin layer of platinum is used on the outer surface of the core-shell catalyst nanoparticles; the core comprises a lower cost metal such as palladium.

Figure 2A:
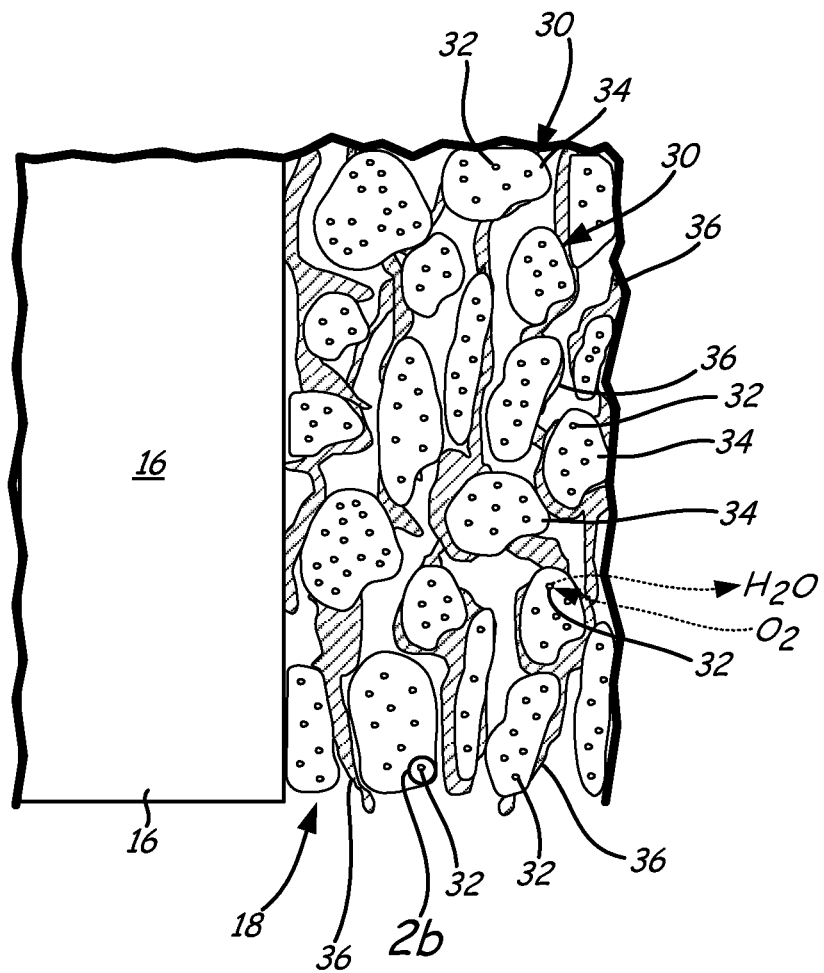
FIG. 2a is an enlarged perspective view of the catalyst layer of FIG. 1 having an ionomer and core-shell catalytic nanoparticles.

FIG. 2a is an enlarged view of cathode CL 18 of FIG. 1, which includes catalyst 30 (having core-shell catalyst nanoparticles 32 and catalyst support 34) and ionomer 36. Ionomer 36 of cathode CL 18 contacts catalysts 30 to form a layer having core-shell nanoparticles 32 finely dispersed throughout. Cathode CL 18 is a matrix of catalyst supports 34, ionomer 36 and core-shell catalyst nanoparticles 32. The matrix allows electrons, protons, water and reactants to move through it. The catalyst support also increases the effective surface area.

Catalyst 30 of cathode CL 18 promotes electrochemical reduction of oxidant. As shown in FIG. 2a, catalyst 30 includes core-shell catalyst nanoparticles 32 supported by or on catalyst supports 34. Catalyst supports 34 are electrically conductive supports, such as carbon black supports. Core-shell catalyst nanoparticles 32 are distributed on catalyst supports 34. Core-shell catalyst nanoparticles 32 are nanoparticles. In one example, core-shell catalyst nanoparticles 32 have a diameter between about 2 nm and about 50 nm.

In cathode CL 18, core-shell catalyst nanoparticles 32 promote the formation of water according to the oxidation reduction reaction: $O_2 + 4H^+ + 4e^- \rightarrow 2H_2O$.

Ionomer 36 in cathode CL 18 connects electrolyte 16 to core-shell catalyst nanoparticles 32 on an ionic conductor level. As illustrated in FIG. 2, ionomer 36 creates a scaffolding structure between catalyst supports 34 of catalyst 30. Ionomer 36 creates a porous structure that enables gas to travel through cathode CL 18 and water to be removed from cathode CL 18. Ionomer 36 also transfers protons from electrolyte 16 to active catalyst sites on core-shell catalyst nanoparticles 32. Anode CL 14 can have the same structure as cathode CL 18.

Figure 2B:
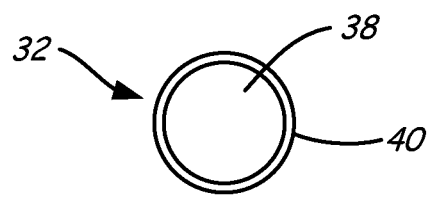
Figure 3:
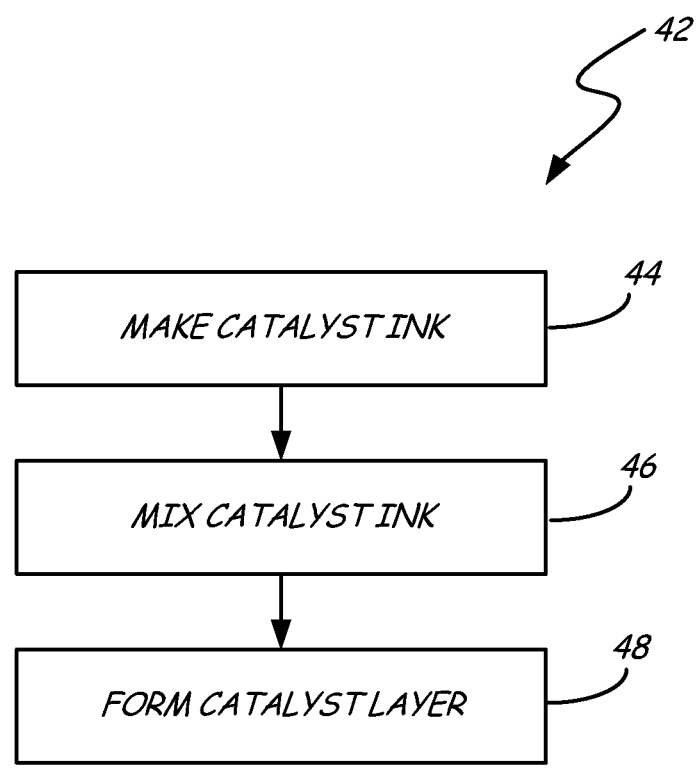

An enlarged cross-sectional view of core-shell catalyst nanoparticles 32 is shown in FIG. 2b. Core-shell catalyst nanoparticles 32 are formed of palladium core 38 and platinum shell 40. Palladium core 38 is formed from palladium or a palladium alloy. Platinum shell 40 surrounds or encapsulates palladium core 38. Platinum shell 40 is an atomically thin layer of platinum or platinum alloy atoms covering the outer surface of palladium core 38. In one example, platinum shell 40 is a monolayer, bilayer or trilayer of platinum atoms. Although core-shell catalyst nanoparticles 32 are shown as being generally spherical in FIG. 2b, core-shell catalyst nanoparticles 32 may have any known shape. For example, core-shell catalyst nanoparticles 32 can have a cubo-octahedron shape.

The platinum atoms of platinum shell 40 cover or encapsulate substantially the entire outer surface of palladium core 38. However, defects (i.e., pin holes) in platinum shell 40 will expose select portions of palladium core 38 to the surrounding environment. At the pH range of interest for UEA 12, palladium is more soluble than platinum. Thus, defects in platinum shell 40 that expose palladium core 38 may result in palladium dissolution. Palladium dissolution can also be the result of movement of palladium to platinum shell 40 by diffusion or a site exchange.

The palladium ions from palladium core 38 may exchange with protons in ionomer 36. Such an exchange changes the properties of ionomer 36. Replacing protons with palladium ions reduces the conductivity of ionomer 36. Displacement of protons may also change the transport properties and equilibrium concentrations of water and dissolved gases. Reduction in available proton concentration may lower the rate of the oxygen reduction reaction, and lead to forming a proton concentration gradient that will affect the overpotential of the fuel cell.

In cathode CL 18 of FIG. 2a, ionomer 36 is a PFSA polymer having an equivalent weight (EW) equal to or greater than about 830. In another example, ionomer 36 is a PFSA polymer having an EW between about 830 and about 1100. In a further example, ionomer 36 is a PFSA polymer having an EW between about 830 and about 1000. In a still further example, ionomer 36 is a PFSA polymer having an EW between about 830 and about 900. EW is the molecular weight that contains 1 mol of ionic groups and indicates the ionic content of the polymer. More specifically, a low EW ionomer has a high ionic content relative to a high EW ionomer, and is therefore more conductive. Despite the lower conductivity of PFSA ionomers with an EW equal to or greater than about 830, experimental results unexpectedly showed that PFSA ionomers with an EW equal to or greater than about 830 had superior transport properties compared with lower EW ionomer when palladium is present.

In the rotating disk electrode example described further below, films were formed on rotating disk electrodes (RDE). The films included carbon supported platinum atoms and a PFSA ionomer. The films contained PFSA ionomers with different EWs. Each RDE was then doped with various amounts of palladium to simulate palladium contamination. The experiments show that palladium ion contamination has little or no affect on the properties of the high EW ionomers, while having a large affect on the transport properties of the low EW ionomers. These results illustrate that palladium dissolution in cathode CL 18 will have less of an affect on the properties of ionomer 36 when ionomer 36 is a PFSA polymer having an EW greater than about 850 as compared to when ionomer 36 is a PFSA polymer having a lower EW, such as 750.

Figure 5:
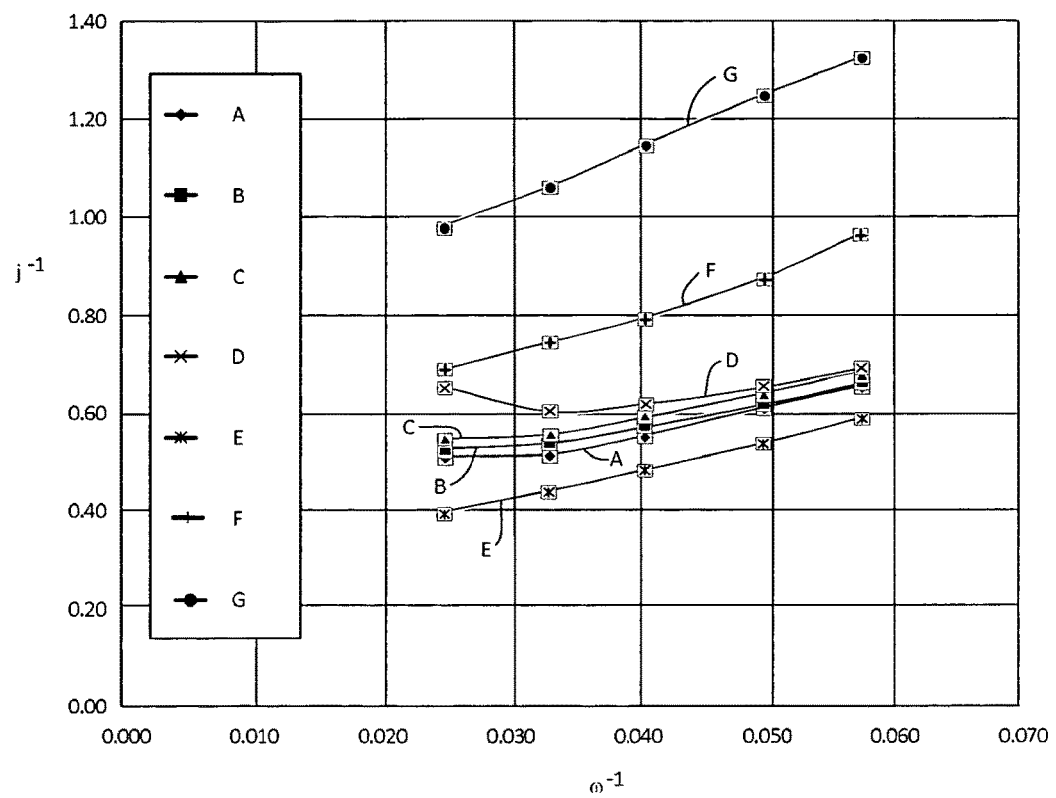
FIG. 5 a Koutecky-Levich plot at 850 millivolts for three electrodes having different equivalent weight ionomers and different palladium doping levels.

Cathode CL 18 can be formed using many different techniques. Example fabrication method 42 is illustrated in FIG. 5 and includes making a catalyst ink (step 44), mixing the catalyst ink (step 46) and forming a catalyst layer (step 48). A catalyst ink is formed in step 44 by mixing catalyst particles with an ionomer in liquid form (i.e., ionomer dissolved or dispersed in a solvent, such as isopropyl alcohol, and water). The ionomer is a PFSA ionomer having an EW equal to or greater than about 830. In one example, the ionomer is Nafion® by E.I. DuPont, USA. As described above, the catalyst particles can be carbon supported core-shell catalyst nanoparticles.

Next, the catalyst ink is mixed using an aggressive mixing procedure to form a dispersion (step 46). The mixing should be sufficient to ensure that the ionomer and the catalyst particles form a homogenous mixture. Example mixing techniques include ball milling, ultrasonication and shear mixing.

In step 48, a catalyst layer is formed with the catalyst ink. In one example, the catalyst layer can be formed by a decal transfer process in which the catalyst layer is formed on a release film by application methods such as spraying or mayer-rod coating. The catalyst layer is then transferred onto the UEA by hot pressing. Example release films suitable for a decal transfer process include Teflon® and Kapton® by E.I. DuPont, USA, and Teflon® derivative substrates. In another example, the catalyst layer is formed by directly applying the catalyst ink onto the UEA. Example application methods for direct deposition include spraying and mayer-rod coating.

As illustrated in the following example, palladium has little to no affect on the properties of an ionomer having an EW greater than about 830. Despite the lower conductivity of higher EW ionomers, these ionomers exhibit superior transport properties compared to lower EW ionomers. The following example is intended as an illustration only, since numerous modifications and variations within the scope of the present invention will be apparent to one skilled in the art.

Rotating Disk Electrode Example

A glassy carbon electrode was polished using 0.05 μm alumina, then rinsed and ultrasonicated to remove any trace of metal. An ink was made using 15 mg of 50% platinum on Ketjen black carbon, 13 mL of Millipore water, 2.5 μL concentrated nitric acid, 3 mL of isopropanol, and the appropriate amount of ionomer from Table 1 that results in a 1:1 ratio of platinum to ionomer solids. The ink was ultrasonicated until well mixed and no individual particles could be seen. 10 μL of the ink was then deposited onto the clean glassy carbon electrode and dried under a lamp.

The electrode was then doped by soaking the electrode in a $Pd(NO_3)_2$ solution. The electrode was soaked in 30 mL of the appropriate concentration of $Pd(NO_3)_2$ in 0.1N $H_2SO_4$ with oxygen bubbling for two hours. The $Pd(NO_3)_2$ concentration was determined by calculating the percentage of ions that were required to exchange with the ionomer to achieve the palladium doping level of Table 1. The doping level (in percent) was calculated according the following equation: (number of palladium cations*charge of palladium (+2))/(number of protons in ionomer*charge of proton(+1))*100.

TABLE 1

| Electrode | EW | Pd doping level (in percent) |
|---|---|---|
| A | 1100 | 0 |
| B | 1100 | 200 |
| C | 830 | 0 |
| D | 830 | 500 |
| E | 750 | 0 |
| F | 750 | 500 |
| G | 750 | 50 |

RDE experiments were completed for clean, undoped films and doped films for three different EW ionomers, 1100, 830, and 750, as illustrated in Table 1. In each experiment, a Ag/AgCl electrode was used as the reference electrode and platinum gauze was used as the counter electrode. Each experiment was run in 0.1N $H_2SO_4$, and oxygen was flowed in the cell for a minimum of 20 minutes before the experiment. Two cycles were recorded from 1.05 to 0.1 $V_{RHE}$ at 10 mV/s and 1600 RPM. This was repeated for 900, 600, 400, and 200 RPM.

Figure 4:
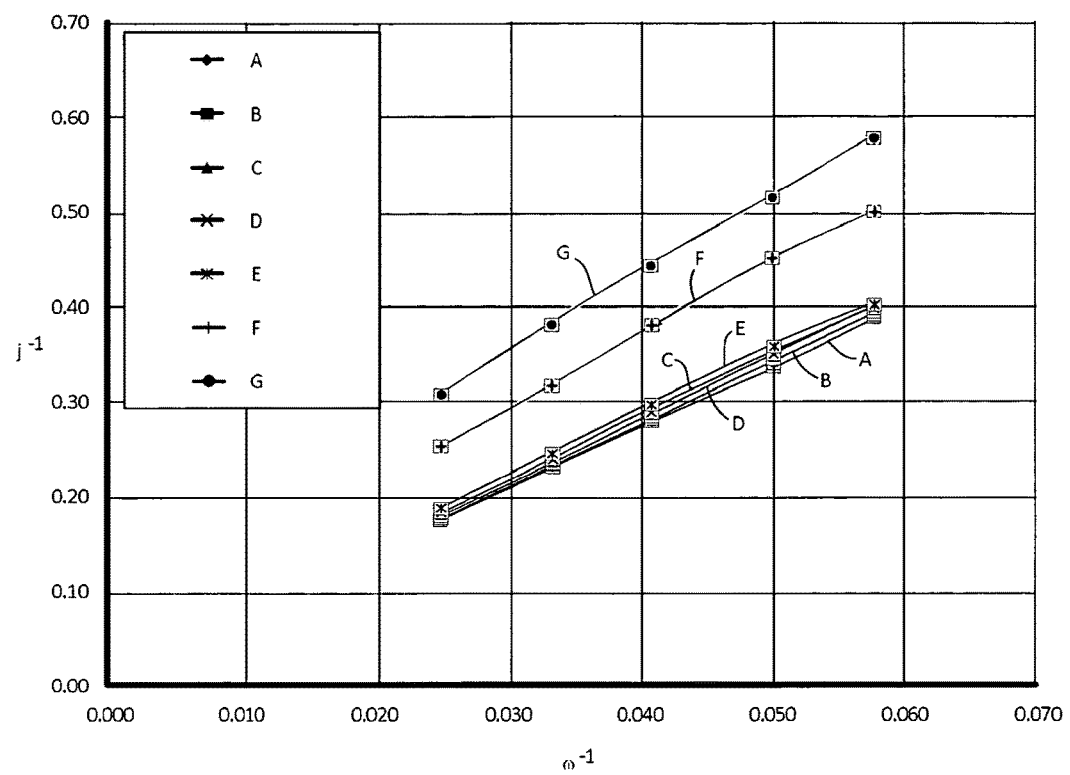
FIG. 4 is a Koutecky-Levich plot at 0.5 volts for three electrodes having different equivalent weight ionomers and different palladium doping levels.

FIG. 4 shows a Koutecky-Levich (KL) plot at 0.5 V for electrodes A-G defined above in Table 1, where ω is the rotational speed in RPM and J is the current density in $mA/cm^2$. The slope for all data samples is the same and is characteristic of transport through the liquid electrolyte. The experimental data for electrode F and electrode G are vertically displaced from the other data sets. Electrodes F and G were palladium doped electrodes containing EW 750 ionomer. For thin film RDE samples, a larger intercept with the vertical axis is indicative of larger kinetic losses or larger transport losses through the ionomer film covering the supported catalyst. Thus, palladium contamination has a large affect on the transport properties of an ionomer with an EW of 750 (i.e., electrode F and electrode G) while having little to no affect on the properties of ionomers with a higher EW, such as 830 (i.e., electrode D) or 1100 (i.e., electrode B). Further, the change in vertical displacement of the 750 EW ionomer electrodes (i.e., electrode F and electrode G) scale with the level of doping. More specifically, electrode G, which had a 500% palladium doping, is more displaced from the majority of the data points compared to electrode F, which had a 50% palladium doping. Thus, a greater palladium contamination results in greater transport losses for low EW (i.e., having an EW of 750 or less) ionomers.

FIG. 4 at 0.5 V emphasizes diffusional losses through the ionomer film. The kinetic overpotential should be quite large at 0.5 V which should lead to an inherent kinetic current much larger than the limiting current for oxygen diffusion through the ionomer film.

FIG. 5 shows a KL plot for electrodes A-G at 850 mV. At this potential, kinetic losses relative to diffusional losses through the ionomer film are emphasized. Similar to the results in FIG. 4, electrode F and electrode G are vertically displaced from the other electrodes. Again, the displacement appears to scale with the level of doping. The significant differences between electrodes F and G, which contained EW 750 ionomer, compared to electrodes B and D, which contained higher EW ionomers, at this potential suggest that replacement of protons in the EW 750 ionomer by palladium also affects the inherent kinetic rate of the oxygen reduction reaction.

To summarize, palladium contamination can change a number of properties of the ionomer, such as but not limited to, reduced conductivity, a change in transport properties and a reduction in the rate of oxygen reduction. FIG. 4 and FIG. 5 show that palladium causes high transport losses in an electrode or catalyst layer formed with an ionomer having an EW of 750. In comparison, palladium has no negative impact on oxygen transport in an electrode formed with an ionomer having an EW equal to or greater than about 830.

As discussed above, cathode CL 18 of FIG. 2a includes core-shell catalyst nanoparticles 32 having palladium core 38 and platinum shell 40. Palladium dissolution can occur at potentials over 0.8 V so that palladium dissolution and exchange into ionomer 36 is a concern. As illustrated in the experimental data above, ionomer 36 having an EW equal to or greater than about 830 will experience little to no transport losses even after palladium contamination. Thus, contrary to recent research that has focused on creating lower EW ionomers in order to increase the conductivity of the ionomer, ionomer 36 is formed of a PFSA ionomer having an EW equal to or greater than about 830 in order to reduce the negative impacts of palladium contamination. In one example, ionomer 36 has an EW equal to or greater than about 830. In another example, ionomer 36 has an EW between about 830 and about 1100. In another example, ionomer 36 has an EW between about 830 and 1000. In a still further example, ionomer 36 has an EW between about 830 and about 900.

Although the present invention has been described with reference to preferred embodiments, workers skilled in the art will recognize that changes may be made in form and detail without departing from the spirit and scope of the invention.

The invention claimed is:

1. A catalyst layer for use in a fuel cell, the catalyst layer comprising:
   catalysts comprising:
      electrically conductive catalyst supports; and
      core-shell catalytic nanoparticles distributed on the catalyst supports, the core-shell catalytic nanoparticles having a palladium core and an atomically thin layer of platinum coating an outer surface of the palladium core, at least one of the core-shell catalytic nanoparticles having a hole in the layer of platinum exposing the palladium core; and
a scaffolding structure of a perfluorosulfonic acid (PFSA) ionomer, the scaffolding structure positioned between and contacting the catalysts, the PFSA ionomer having ionic conductor properties that are reduced in response to exposing the palladium core, the PFSA ionomer having an equivalent weight ranging from 830 to 900, the equivalent weight minimizing the reduction of the ionic conductor properties.

2. The catalyst layer of claim 1, wherein the atomically thin layer is a monolayer, a bilayer, or a trilayer of platinum metal atoms.

3. The catalyst layer of claim 1, wherein the core-shell catalytic nanoparticles have a diameter between about 2 nanometers and about 50 nanometers.

4. A unitized electrode assembly (UEA) comprising:
an electrolyte; and
a catalyst layer on a first side of the electrolyte, the catalyst layer comprising:
catalysts comprising:
electrically conductive catalyst supports; and
core-shell catalytic nanoparticles distributed on the catalyst supports, the core-shell catalytic nanoparticles having a palladium core and a platinum shell generally encapsulating the palladium core, at least one of the core-shell catalytic nanoparticles having a hole in the platinum shell exposing the palladium core; and
a scaffolding structure of a perfluorosulfonic acid (PFSA) ionomer, the scaffolding structure positioned between and contacting the catalysts, the PFSA ionomer having ionic conductor properties that are reduced in response to exposing the palladium core, the PFSA ionomer having an equivalent weight ranging from 830 to 900, the equivalent weight minimizing the reduction of the ionic conductor properties.

5. The UEA of claim 4, wherein the platinum shell is an atomically thin layer on an outer surface of the palladium core.

6. The UEA of claim 5, wherein the atomically thin layer is a monolayer, a bilayer, or a trilayer of platinum metal atoms.

7. The UEA of claim 4, wherein the core-shell catalytic nanoparticles have a diameter between about 2 nanometers and about 50 nanometers.

8. The UEA of claim 4, wherein the core-shell catalytic nanoparticles have a cubo-octahedral shape.

9. The UEA of claim 4, wherein the catalyst layer is a cathode catalyst layer.

10. The catalyst layer of claim 1, wherein the core-shell catalytic nanoparticles have a cubo-octahedral shape.

11. A method comprising:
improving a rate of oxygen reduction in a fuel cell having palladium contamination, the fuel cell including an electrolyte and a catalyst layer on the electrolyte, the catalyst layer including catalysts and a perfluorosulfonic acid (PFSA) ionomer having an equivalent weight ranging from 830 to 900, the catalysts including electrically conductive catalyst supports and core-shell catalytic nanoparticles distributed on the catalyst supports, the nanoparticles having a palladium core and a platinum shell generally encapsulating the palladium core, the palladium contamination caused by at least one of the core-shell catalytic nanoparticles having a hole in the platinum shell exposing the palladium core, the improving including:
contacting the catalyst layer of the fuel cell with oxygen gas; and
minimizing effects of the palladium contamination on the rate of oxygen reduction, based on the equivalent weight of the PFSA ionomer.

12. The method of claim 11, the improving further comprising:
conducting protons from the electrolyte to the core-shell catalytic nanoparticles, the PFSA ionomer acting as a proton conductor,
wherein the improving the rate of oxygen reduction includes minimizing effects of the palladium contamination on the conducting protons from the electrolyte to the core-shell catalytic nanoparticles, based on the equivalent weight of the PFSA ionomer.

* * * * *